Oct. 29, 1957  G. E. NICHOLS  2,810,974
EASEL TYPE MOUNTS
Filed Oct. 18, 1955  2 Sheets-Sheet 1

Inventor
Gordon E. Nichols
by Roberts, Cushman & Grover
Attorneys

Oct. 29, 1957 G. E. NICHOLS 2,810,974
EASEL TYPE MOUNTS

Filed Oct. 18, 1955 2 Sheets-Sheet 2

Inventor
Gordon E. Nichols
by Roberts, Cushman & Grover
Att'ys

United States Patent Office 2,810,974
Patented Oct. 29, 1957

2,810,974

EASEL TYPE MOUNTS

Gordon E. Nichols, Middleboro, Mass., assignor to Winthrop-Atkins Co., Inc., Middleboro, Mass., a corporation of Massachusetts Application October 18, 1955, Serial No. 541,198

11 Claims. (Cl. 40—120)

This invention relates to mounts such as are used to support photographs and/or calendar pads on a desk or table and has for its principal objects to provide an improved easel leg and lock therefor, for supporting the mount in an upright, rearwardly inclined position, which is of very simple construction, can be made with the minimum number of operations, which may be pocketed within the back ply of the mount so as to keep the overall thickness at a minimum when collapsed, which is easy to set up and fold, which provides stability, is non-collapsible except by manual disengagement of the parts, is sturdy and is of pleasing appearance.

The mount has a stiff support, to the front face of which may be attached a faceboard containing a sight opening, behind which may be placed a photograph and/or calendar pad. As herein illustrated, to hold the support and hence the faceboard upright a leg is hinged to the support and the support and leg carry respectively, interengageable shoulders located above the hinge line of the leg, the edge of the shoulder on the leg being at a slightly greater distance from the hinge than the shoulder on the support, and engageable beneath the shoulder on the support by rearward swinging movement of the leg. In one form the support has front and rear plies. In this form the shoulder on the support is constituted by the upper edge of an aperture made through the front ply above the hinge line of the leg. The leg is partially severed from the rear ply so as to be hinged thereto and the shoulder on the leg is constituted by a tongue midway between the ends of the hinge which projects upwardly therefrom beyond the upper edge of the aperture. Alternatively the support may be a single ply and the leg may be attached to the rear side thereof with a spacer interposed intermediate the support and leg which has a downwardly facing edge beneath which the tongue on the leg may be wedged. While it is desirable to keep the front to back thickness of the mount at a minimum it may be increased or decreased by adding or leaving out plies between the front and back as desired so as to provide different depth pockets for the appurtenances to be supported by the mount without departing from the essential features of the locking means.

The invention will now be described in greater detail with reference to the accompanying drawings wherein.

Figure 1:
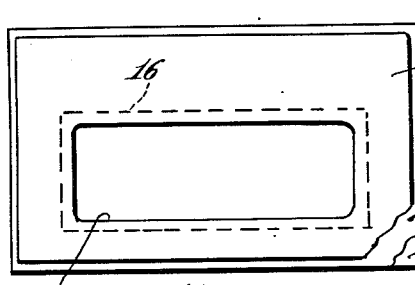
Fig. 1 is a front view of the mount in a collapsed or folded condition.
Figure 3:
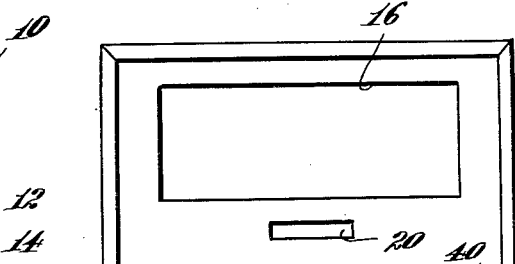
Fig. 3 is a plan view of the mount with the front folded upwardly from the back so that the front and back lie in a common plane.
Figure 2:
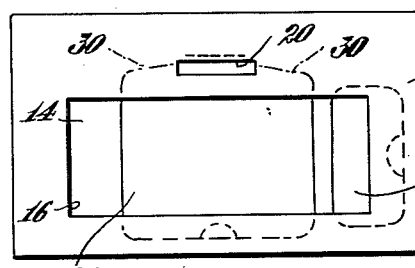
Fig. 2 is a back view of the mount in a collapsed or folded condition.

Referring to the drawings, the mount has in one form a faceboard 10, fastened to the front side of a support, constituted by front and rear plies 12 and 14. The front ply 12 (Fig. 3) has a horizontally located, substantially rectangular opening 16 of suitable size to receive a calendar pad or photograph and the faceboard 10 has a smaller opening 18 so that the edges of the latter overlap the opening 16 to retain the photograph or calendar in place. The front ply 12 also, as shown in Fig. 2, has above the opening 16 an opening 20, the upper edge of which is substantially parallel to the upper edge of the ply. The rear ply 14, which is hinged edge to edge with the front ply, as shown in Fig. 3, and as will be described hereinafter, has partially severed from it a leg 22 and a door 24. The leg 22 is severed from the rear ply along spaced lines 26—26 running from top to bottom of the ply and a horizontal line 28 paralleling the lower edge which intersects the lower ends of the lines 26—26. The upper end of the leg is connected to the ply by hinges 30—30, formed by embossing the substance of the ply and intermediate these hinged portions there is a U-shaped cut 32, which forms at the upper end of the leg an upwardly projecting tongue 34 which lies substantially opposite the opening 20 in the front ply board 12. Preferably the hinge is formed by embossing along a slightly curved line. The edge of the tongue parallels the upper edge of the ply and is closer to the hinge joining the plies than is the upper edge of the slot 20.

The front and back plies 12 and 14 are folded into contact about their hinge and fastened by suitable means, such as adhesive or staples and thus form a unit support for the faceboard 10. To set the mount upright the leg 22 is swung rearwardly and since the tongue 34 forms an integral extension of the leg and is above the hinged line of the leg it will swing forwardly into the slot 20 in the front ply. As pointed out previously the edge of the tongue 32 is further from the hinge line than the edge of the opening 20, hence as the leg is swung rearwardly the tongue is actually wedged into the opening beneath the upper edge thereof and thus becomes locked in place until it is manually disengaged.

Figures 4, 5:
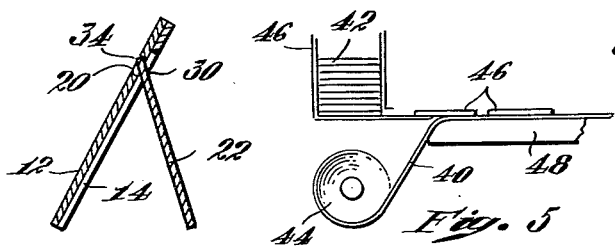
Fig. 4 is a side view in vertical section of the mount set up.
Fig. 5 is a diagrammatic view of the method of assembling the parts of the mount for manufacture.
Figure 6:
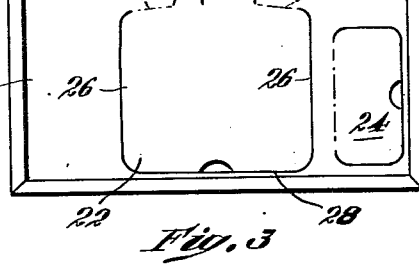
Fig. 6 is a plan view of the front and back parts resting on a wrapper sheet prior to folding.
Figure 7:
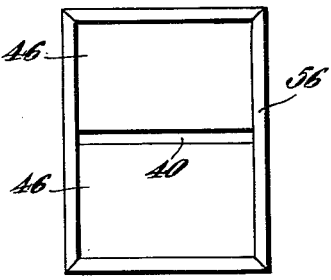
Fig. 7 is a plan view of the front and back parts with the wrapper sheet folded.
Figure 10:
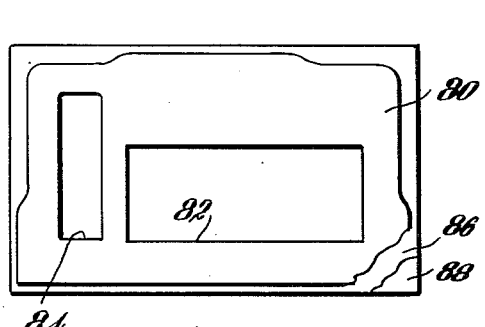
Fig. 10 is a front view of an alternatively constructed mount provided with a calendar pad pocket and a thermometer pocket.

The front and back plies of the mount are preferably joined in a folding machine, diagrammatically illustrated in Fig. 5, in which the facing paper 40 and blanks 42 are delivered from a roll of paper 44 and a magazine 46 respectively, in superposed relation to each other on a horizontal support 48. The width of the paper 40 is enough wider than the blanks 42 to provide margins at the ends of the blanks and the blanks themselves are delivered from the magazine in spaced relation. Suitable means, not shown, is provided for cutting off the paper at the place where folding is to take place to leave margins at the forward edge of the first blank and at the rear edge of the second blank. Prior to folding the assembly of the facing paper and blanks appear, as shown in Fig. 6, with the adjacent edges of the blanks 42 spaced and parallel to each other and with margins 50 and 52 at the ends and sides of the blanks. The margins are then folded as shown in Fig. 7, so that the blanks 42 are connected at their adjacent edges by the paper 40. That portion of the paper 40 intermediate the adjacent edges constitutes a hinge about which the blanks may be folded so as to have contact. Prior to folding the covered blanks are operated upon by suitable dies to cut the openings 16 and 20 in one blank 42, and the leg 22, locking tongue and door 24 in the other blank 42, thus providing the unit shown in Fig. 3. The paper may be precoated with a pressure or heat sensitive adhesive so that it will adhere to the entire surface to which it is applied.

Figure 8:
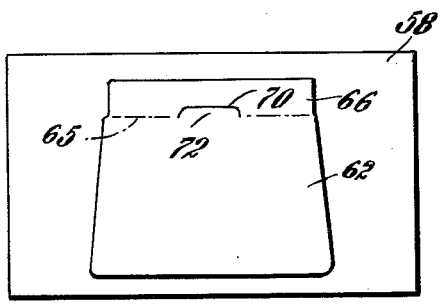
Fig. 8 is a back view of an alternative way of attaching the leg.
Figure 9:
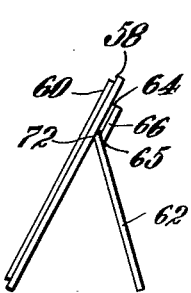
Fig. 9 is a side view of the mount shown in Fig. 9 set up.

An alternative way of constructing the leg and locking tongue is shown in Figs. 8 and 9. In this form the support 58 may be single ply, and has a faceboard 60 attached to its front side. A leg 62 is attached to its rear side with a narrow spacer strip 64 interposed between its upper edge and the back side of the support 58. The leg is connected to the support by a hinged leaf 66 at its upper end of slightly greater top to bottom width than the spacer strip 64, which may be fastened to the support by staples passing through it and the spacer 64 into the support. The hinged leaf and leg are integrally connected by a hinge 65 which is constituted by embossing the substance of the leg and leaf along spaced lines paralleling the top of the support. Midway between the embossed lines forming the hinge 65, the substance of the leg and leaf are cut through along a line 70 to form a tongue 72, the upper edge of which parallels the lower edge of the spacer and is slightly closer to the upper edge of the support than is the downwardly facing edge of the spacer strip. As thus constructed, when the leg 62 is swung rearwardly on the hinge 65 the tongue 72 swings forwardly beneath the lower edge of the intermediate strip 64 and thus becomes locked in place.

Figure 12:
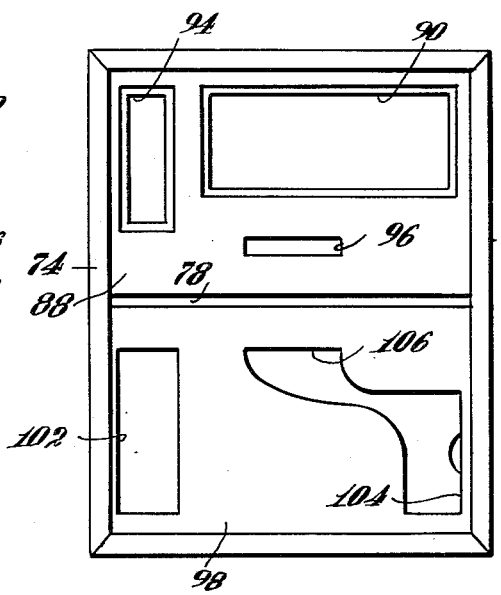
Fig. 12 is a plan view of the mount with the front folded upwardly so that the front and back lie in a common plane.
Figure 11:
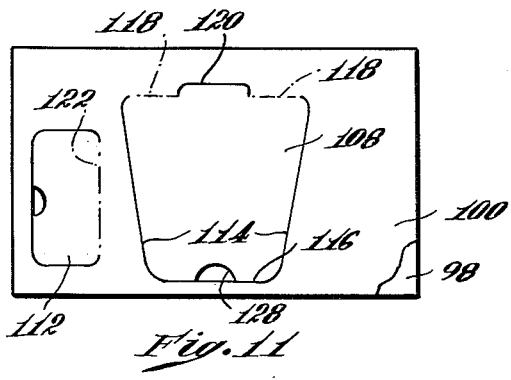
Fig. 11 is a back view of the mount shown in Fig. 10.
Figure 14:
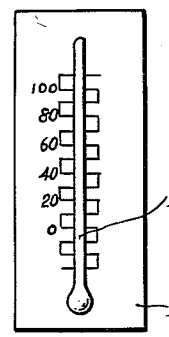
Fig. 14 is a plan view of the thermometer and scale card.
Figure 13:
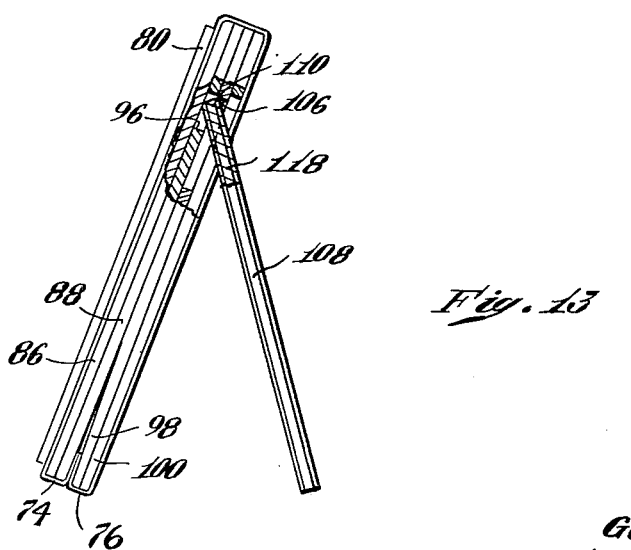
Fig. 13 is a side view in vertical section.

A specially constructed mount embodying the leg and locking principles described above for the purpose of supporting both a calendar pad and thermometer card is shown in Figs. 10 to 14 inclusive. The mount consists of front and rear panels 74 and 76, connected by a hinge 78 constituted by means of facing paper wrapping the same, as will appear hereinafter. The front panel 74 is comprised of a faceboard 80 and intermediate and back plies 86 and 88. The faceboard has a horizontally arranged, elongate opening 82 therethrough and a vertically arranged elongate opening 84 therethrough, the former being for a calendar pad and the latter for a thermometer and supporting card. Each of the plies 86 and 88 has three openings therein, a horizontally arranged, elongate opening 90 of slightly greater width and length than the opening 82, a vertical opening 94 of slightly greater length and width than the opening 84 and a horizontally arranged slot 96. The combination of the faceboard and plies 86 and 88 provide depth for the pockets in the panel 74 for receiving the pad and thermometer. The panel 76 is comprised of two plies 98 and 100. The inner one of these plies, as shown in Fig. 12, has cut through it a rectangular opening 102 corresponding to the opening 94 in the panel 76. Additionally, there is cut through this ply, near the opposite end, a substantially rectangular opening 104 with a branch extending from one corner toward its midpoint at its inner edge to provide an edge 106 paralleling the inner edge of the ply substantially opposite the opening 96 in the panel 74. The edge 106 and the adjacent edge of the opening 96 are substantially equidistant from the hinge 78. The outer ply 100 has a leg 108, a locking tab 110 and a door 112. The leg 108 is severed from the ply along converging lines 114—114, and a line 116 joining the lower ends of the lines 114—114. The upper end of the leg is connected by hinges 118—118 formed by embossing the substance of the ply and intermediate the hinges is cut away along a U-shaped line 120 to form the tongue 110. The hinge 118 lies below the edge 106 and the edge of the tongue 110 lies above it. The door 112 is cut away along three sides and connected at its fourth by a hinge 122. When the panels 74 and 76 are folded together the openings 84, 94 and 102 are in registration so as to provide a deep vertical pocket for a thermometer and supporting card and the openings 80 and 90 are in registration so as to provide a pocket for reception of a calendar pad. The opening 96 lies opposite the edge 106 so that when the leg is swung rearwardly the tongue 110 passes beneath the edge 106 where it becomes wedged with a portion of it projecting into the opening 96. The door in the panel 76 permits inserting a pad into the pocket between the panels after they are permanently joined.

The plies 86 and 88 forming the front panel and the plies 98 and 100 forming the back panel are connected together by a paper facing covering the exposed sides and folded over and secured along the margins of the inner sides. Preferably the front ply 98 of the rear panel 76 is covered with facing paper so that when the leg is swung rearwardly to set the mount up the underlying ply will have a finished appearance. The front side of the rear ply 100 is also covered so that the door 112 will be faced on both sides. Since both the panels are cut clear through when the openings 84, 94 and 102 are made the back of the pocket for the thermometer is constituted by the paper covering the back of the panel 76. The thermometer 124 (Fig. 14) is mounted on a flat card 126 corresponding substantially in size to the opening 102 and is set into the opening just before the panels are folded together and secured. The overlapping margin of the opening 84 in the faceboard retains the thermometer card within the pocket.

A notch 128 is cut in the lower end of the leg to facilitate lifting it out of the recess for setting up.

It should be understood that the present disclosure is for the purpose of illustration only and that this invention includes all modifications and equivalents which fall within the scope of the appended claims.

I claim:

1. In an easel type mount, a support, a leg hinged to the support for swinging movement to a rearwardly disposed position for holding the support in an upright, rearwardly inclined position, a horizontallly disposed shoulder on the support above the hinge line of the leg and a second horizontally disposed shoulder carried by the leg and movable therewith forwardly, beneath said first shoulder, frictionally to hold the leg in its rearwardly disposed position, said shoulders lying within the confine of the front and rear sides of the mount and said second shoulder having an edge which is at a greater distance from the hinge than the edge of the first shoulder.

2. In an easel type mount, a support, a leg hinged to the support for swinging movement to a position for holding the support in an upright, rearwardly inclined position, said support and leg having opposed shoulders, the edges of which lie at different distances from the hinge line of the leg, the edge of the shoulder carried by the support being at the lesser distance from the hinge, and the shoulder carried by the leg being pivotal about the hinge in a direction opposite to the rearward movement of the leg to wedge its edge beneath the shoulder carried by the support.

3. In an easel type mount, a support having an opening in it providing a downwardly facing shoulder at the rear side of the support, a leg attached to the rear side of the support by hinge means which lie below the shoulder, and a tongue carried by the leg which extends upwardly therefrom beyond the hinge means by an amount exceeding the distance between the shoulder and the hinge means, said tongue being swingable forwardly in a direction opposite to the rearward swing of the leg on its hinge to wedge it beneath the shoulder.

4. In an easel type mount, a support having an aperture through it, a leg hinged to the support beneath the aperture and a tongue extending from the leg beyond its hinge and beyond the upper edge of the aperture, said tongue being swingable inwardly beneath the upper edge of the aperture by outward swinging movement of the leg.

5. In an easel type mount, a support, a spacer strip and a leg fastened to the support with the spacer strip between the support and leg and with an edge of the spacer substantially parallel to the upper edge of the support and facing downwardly, hinge means connecting said leg to the support for swinging movement rearwardly, said hinge means being located below the downwardly facing edge of the spacer and a tongue projecting upwardly from the leg beyond its hinge means and beyond the downwardly facing shoulder by a small amount, said tongue being adapted to be lodged beneath the downwardly facing edge of the spacer by swinging the leg rearwardly from the support.

6. In an easel type mount, a support, a downwardly facing shoulder on the support, a leg connected to the support by an arcuate hinge located below the shoulder and a tongue extending from the hinge midway between its ends to a place just beyond the level of the downwardly facing shoulder, said tongue being swingable inwardly by outward swinging movement of the leg to jam the end of the tongue beneath the shoulder.

7. An easel according to claim 1, wherein a faceboard is attached to the support and has an aperture through it behind which may be placed a calendar pad.

8. An easel mount according to claim 1, wherein a faceboard is attached marginally to the support and has a sight opening through it, that portion of the support behind the sight opening having a correspondingly located opening of greater width and length providing a pocket behind the faceboard, and a hinged door in the back side of the support adjacent an end thereof through which a pad may be inserted into the pocket so as to be visible through the opening in the faceboard.

9. An easel mount according to claim 1, wherein the support is comprised of two panels, the rear panel having at least two plies, and wherein the leg and locking tongue are formed in the rear ply and the abutment is formed in the front ply.

10. An easel mount according to claim 1, wherein the support is comprised of two panels, each panel consisting of at least two plies, the leg and locking tongue being formed in the rear ply of the back panel, the shoulder being constituted by an opening in the front ply of the back panel and the rear ply of the front panel having an opening correspondingly located for the reception of the edge of the tongue when swung into operative position beneath the upper edge of the opening in the front ply of the rear panel.

11. An easel mount according to claim 1, wherein the support is comprised of two multi-ply panels arranged face to face, each panel having openings inwardly of its exposed ply which register to form pockets for receiving the calendar and thermometer, and the front ply of one panel has correspondingly registering openings of smaller overall area through which the pad and calendar may be seen, and said locking tongue and support being formed in the rear panel.

References Cited in the file of this patent

UNITED STATES PATENTS

| | | |
|---|---|---|
| 1,359,662 | Blyth | Nov. 23, 1920 |
| 1,892,014 | Singer et al. | Dec. 27, 1932 |
| 1,892,492 | Molner | Dec. 27, 1932 |
| 2,314,417 | Neal | Mar. 23, 1943 |
| 2,769,261 | Laughlin | Nov. 6, 1956 |